(12) United States Patent
Medawar (10) Patent No.: US 11,075,858 B2
(45) Date of Patent: Jul. 27, 2021

(54) A664 SYNCH NETWORK DESIGN

(71) Applicant: The Boeing Company, Chicago, IL (US)

(72) Inventor: George F. Medawar, Huntsville, AL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/445,197

(22) Filed: Jun. 18, 2019

(65) Prior Publication Data
US 2020/0403939 A1 Dec. 24, 2020

(51) Int. Cl.
*H04L 12/931* (2013.01)
*H04L 12/935* (2013.01)
*H04L 12/46* (2006.01)

(52) U.S. Cl.
CPC ........ *H04L 49/351* (2013.01); *H04L 12/4641* (2013.01); *H04L 49/3081* (2013.01)

(58) Field of Classification Search
CPC H04L 49/351; H04L 49/3081; H04L 12/4641
USPC ........................................ 370/392, 389, 516
See application file for complete search history.

(56) References Cited

U.S. PATENT DOCUMENTS

| | | | | |
|---|---|---|---|---|
| 7,242,683 B2* | 7/2007 | Saint Etienne | ......... | H04L 47/24 370/389 |
| 2008/0112439 A1* | 5/2008 | Vestal | ................. | H04L 12/4015 370/516 |
| 2016/0294697 A1* | 10/2016 | Varadarajan | ............ | H04L 47/28 |
| 2019/0081734 A1* | 3/2019 | Monnier | ............... | H04L 1/0061 |

* cited by examiner

*Primary Examiner* — Kwang B Yao
*Assistant Examiner* — Syed M Bokhari
(74) *Attorney, Agent, or Firm* — MH2 Technology Law Group LLP (57) ABSTRACT

A synchronous computer-controlled communications network is provided that includes an Ethernet network switch; one or more avionics computers communicatively coupled in the synchronous computer-controlled communications network, and one or more end systems communicatively coupled in the synchronous computer-controlled communications network, wherein each of the one or more end systems, wherein the synchronous computer-controlled communications network is synchronized by a synchronization schedule that provides a common start time of a Major Time Frame or the start of a particular partition of the one or more avionics computers based on a user configuration, wherein a first avionics computer of the one or more avionics computers is configured to transmit an Event Synchronous Frame (ESF) to the Ethernet switch, wherein the ESF indicates that the first avionics computer is ready to integrate in a configured synchronous computer-controlled communications network.

20 Claims, 10 Drawing Sheets

A664 SYNCH NETWORK DESIGN

FIELD

The present disclosure relates to systems and methods for managing computing resources, and more particularly to systems and methods for scheduling and controlling asynchronous tasks to provide deterministic behavior in time-partitioned operating systems.

BACKGROUND

An Operating System ("OS") is software that manages computing hardware on behalf of user applications. The OS manages hardware resources such as the computer memory, the Input/Output (I/O) devices including the hard drive and the network interface, and so forth. One of the most important hardware resources managed by the OS is the central processing unit ("CPU"). The OS allocates time on CPU to each application, one at a time, by means of a scheduling algorithm that selects which application (called a process when executing) will be run on the CPU next. The OS itself must run on the CPU in order to execute the scheduling algorithm, so whenever a process calls the operating system (e.g., through an I/O system call), the OS is invoked and run on the CPU. It then selects the next process to run. The OS also sets a hardware timer to expire on a periodic basis. When the timer expires, the hardware invokes the OS, interrupting the running process so that the OS can select a new process to run, based on the scheduling algorithm. A computer chip that contains more than one CPU is called a multicore processor. Each core is a CPU. The OS then schedules a different process for each core. A number of scheduling algorithms are available for an OS to use. Some algorithms provide good responsiveness to user input in a Graphical User Interface (GUI), e.g., by providing more CPU time to the application running in the window on the top of the GUI desktop. Some algorithms provide CPU time in order to improve the likelihood that each process meets any declared deadlines. A Real Time Operating System (RTOS) uses scheduling algorithms that provide strong guarantees for meeting deadlines.

A partitioned operating environment is a special type of OS that strictly manages all shared hardware resources (such as the CPU, memory, and I/O) so that each application is guaranteed to receive its allocated share of the managed resources during any specified time interval, where this interval is sometimes called the "major time interval" or Major Time Frame (MTF). Each application receives a portion of the time on a time-partitioned resource, such as the CPU, called a partition window. During that window of time, the application has sole access to the resource and to the exclusion of all other applications.

Figure 1:
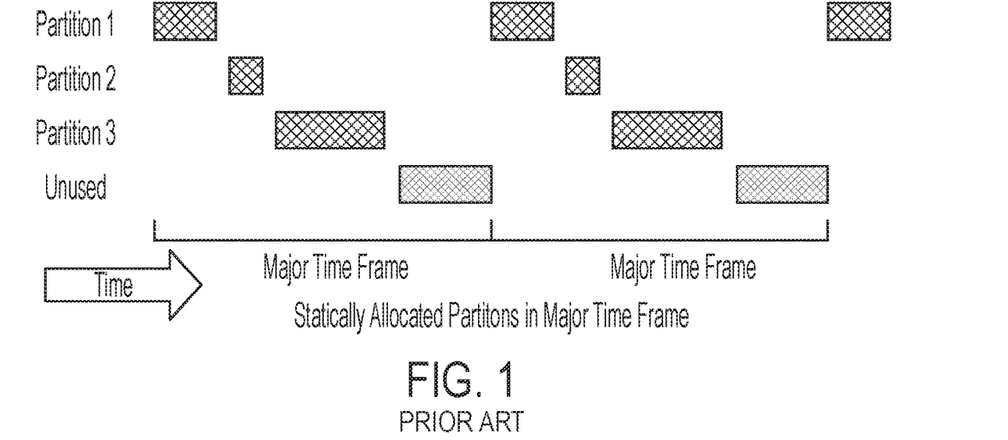
FIG. 1 is an illustration of the time allocation of three partitions in a major time frame in accordance with the prior art.

In many time-partitioned operating systems (including, but not limited to ARINC 653 partitioned operating environments), a repeating major time frame is used to periodically run all applications in the system. Each application is statically scheduled during one or more of the partition windows during the major time frame. FIG. 1 illustrates three partitions allocated in a major time frame. FIG. 1 shows the time allocated to each partition for two consecutive major time frames. It also includes a portion of unused time in each major time frame. As can be seen, each partition receives a deterministic amount of CPU time during each major time frame. The operating system enforces this allocation so that no partition uses more than its allotment and no partition can interfere with other partitions. The partitions may themselves contain not only applications, but an entire operating system. The basic principle of time partitioning remains the same.

Figure 2:
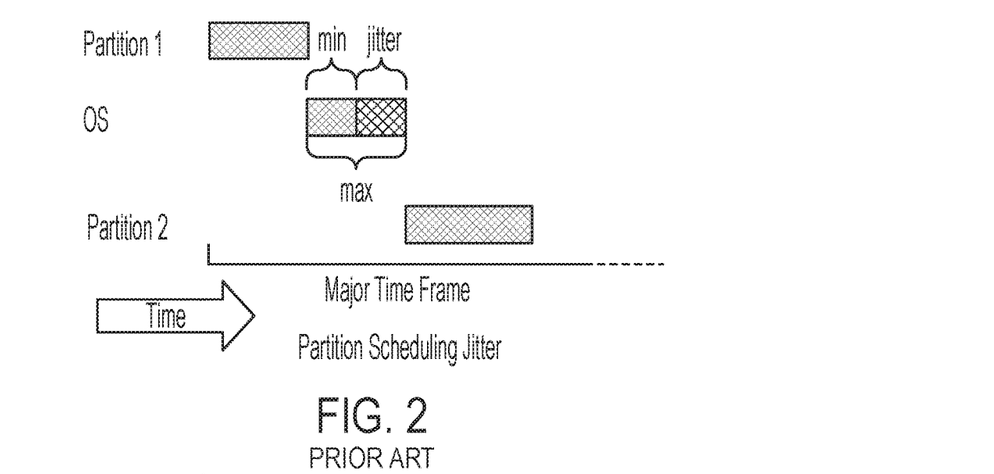
FIG. 2 is an illustration showing partition scheduling jitter in accordance with the prior art.

The gap in time between the partitions shown in FIG. 1 represents the overhead time required by the operating system to stop one partition and start another. This is sometimes called the partition switch time. The partition switch time varies between the minimum time (Best-Case Execution Time) and the maximum time (Worst-Case Execution Time) of the operating system task responsible for switching partitions off and on the CPU. This variation is called the jitter, illustrated in FIG. 2. Some time-partitioned operating systems, including many implementations of an ARINC 653 partitioned operating environment, attempt to minimize the jitter so that partitions start at nearly the same time within the major time frame as possible for each repetition of the major time frame, so that their period of execution is nearly constant. That is, their period of execution is equal to the major time frame duration, or nearly so. The deviation from this constant period could be as large as the sum of the jitter for all prior partition switches during any particular major time frame.

Figure 3:
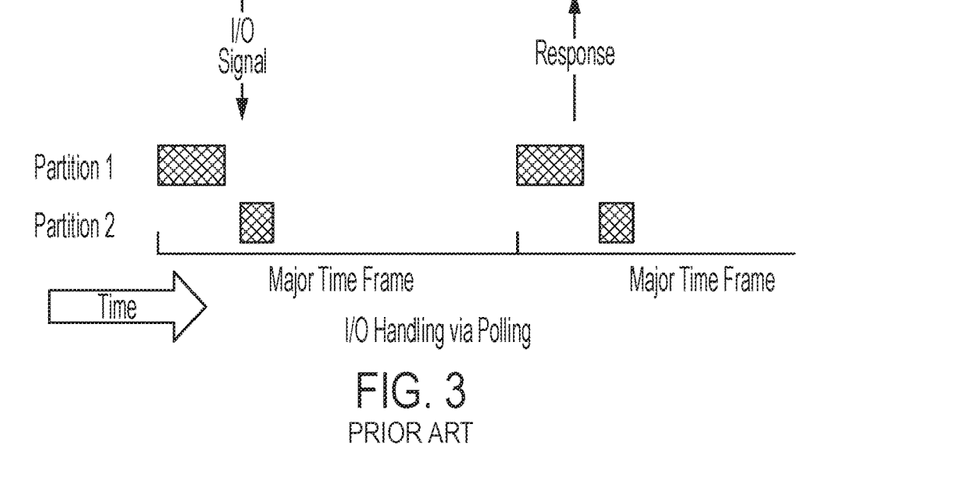
FIG. 3 is an illustration demonstrating operation of a prior art system incorporating input/output handing using a polling method.

The problem with the standard approach is that time-partitioned operating systems generally do not permit the use of asynchronous tasks such as interrupts. This is because interruption of a partition could interfere with its allocation of time on the CPU or affect its performance in other ways (such as reducing cache hit rates). However, interrupts are the most commonly understood and utilized mechanisms in computer systems for dealing with events that occur asynchronously (such as the arrival of an I/O signal to the computing hardware). Prohibition of interrupt mechanisms for handling I/O forces use of the lower-performance "polling" mechanism, whereby a partition only acts on an I/O event when it is scheduled, which could result in latency of an entire major time frame or more. FIG. 3 illustrates this delay in responding to an input signal because the system cannot handle the I/O until the associated partition (Partition 1 in this example) is scheduled. In essence, the standard approach suffers high latency in I/O response as a consequence of requiring a certain kind of determinism (very small variability in the period of execution for partitions).

Accordingly, what is need is an improved scheduling and controlling process that can address the above-noted deficiencies of the current approaches.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In accordance with examples of the present disclosure, a synchronous computer-controlled communications network is provided that comprises an Ethernet network switch; one or more avionics computers communicatively coupled in the synchronous computer-controlled communications network, and one or more end systems communicatively coupled in the synchronous computer-controlled communications network, wherein each of the one or more end systems, wherein the synchronous computer-controlled communications network is synchronized by a synchronization schedule that provides a common start time of a Major Time Frame or the start of a particular partition of the one or more avionics computers based on a user configuration, wherein a first avionics computer of the one or more avionics computers is configured to transmit an Event Synchronous Frame (ESF) to the Ethernet switch, wherein the ESF indicates that the first avionics computer is ready to integrate in a configured synchronous computer-controlled communications network, and wherein the first avionics computer is configured to receive a network notification, a health and status notification, or both from the Ethernet network switch indicating how to proceed to integrate into the configured synchronous computer-controlled communications network, and wherein the Ethernet network switch is configured to receive the ESF from the first avionics computer through a first end system of the one or more end system, process the ESF based on a network configuration, and transmit the network notification, the health and status notification, or both to each avionic computer of the one or more avionics computers on the synchronous computer-controlled communications network.

Various examples of the present disclosure can include the following features. In some examples, the ESF is formatted as an Ethernet frame. In some examples, the common start time is established by aligning the major time frame or a configured process for each avionic computer on the configured synchronous computer-controlled communications network through a respective end system. In some examples, a size of the major time frame is not uniform for all the one or more avionics computers on the configured synchronous computer-controlled communications network. In some examples, the synchronous computer-controlled communications network is an avionics full-duplex switched Ethernet (AFDX) data network. In some examples, additional network synchronization schedules and network attributes are configured based on an additional ESF. In some examples, the ESF comprises of a set of defined reserved Virtual Link ID to indicate to the Ethernet switch that a message transmitted by the first avionics computer is a protocol frame and to be processed by the Ethernet switch.

In accordance with examples of the present disclosure, a computer-implemented method of providing a common start time for an application partition schedule for communicating parties in a synchronous computer-controlled communications network is provided. The computer-implemented method comprises providing, by an avionics computer, a readiness signal to an end system associated with the avionics computer, wherein the readiness signal indicates the avionics computer readiness to integrate into a synchronous network; receiving, by the avionics computer, a response from the end system based on the readiness signal; and executing, by an avionics computer in the synchronous computer-controlled communications network, a synchronization schedule, wherein the synchronization schedule provides for establishment of avionics subsystem partitions execution is included in the synchronous computer-controlled communications network.

Various examples of the present disclosure can include the following features. In some examples, the readiness signal is provided as an Event Synchronous Frame (ESF). In some examples, the ESF is formatted as an Ethernet frame. In some examples, the computer-implemented method can further comprise providing, by the avionics computer, the ESF to an Ethernet switch through the end system. In some examples, the computer-implemented method can further comprise receiving, by the avionic computer, a network health and status for other avionic computers on the synchronous computer-controlled communications network. In some examples, the ESF comprises a defined reserved Virtual Link ID to indicate that the avionics computer is ready to integrate into the synchronous computer-controlled communications network.

In accordance with examples of the present disclosure, a computer-implemented method of providing a common start time for an application partition schedule for communicating parties in a synchronous computer-controlled communications network is provided. The computer-implemented method comprises executing, by an avionics computer on the synchronous computer-controlled communications, a synchronization schedule, wherein the synchronization schedule provides a common start time for an application partition schedule; providing, by the avionics computer on the sync network, an Event Synchronous Frame (ESF) to an associated end system; providing, by the associated end system, the ESF to a network switch when the corresponding avionics computer is ready to integrate in the synchronous network; receiving, by the associated end system, a network status from the network switch to be provided to the avionics computer; receiving, by the network switch, EFS from the associated end system on the synchronous network; processing, by the network switch, the EFS based on a network configuration; and transmitting, by the network switch, the network status to each avionics computer on the synchronous network through associated end systems.

Various examples of the present disclosure can include the following features. The network switch is an Ethernet switch. The ESF is formatted as an Ethernet frame. The ESF provides for a common start time by aligning a major time frame or a configured process for each avionic computer on the synchronous network through the associated end systems. A size of the major time frame is not uniform for other avionics computers on the synchronous network. The synchronous network is an avionics full-duplex switched Ethernet (AFDX) data network. The ESF comprises a defined reserved Virtual Link ID to indicate that the avionics computer is ready to integrate into the synchronous network.

BRIEF DESCRIPTION OF THE FIGURES

The accompanying drawings, which are incorporated in, and constitute a part of this specification, illustrate implementations of the present teachings and, together with the description, serve to explain the principles of the disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

In a safety critical Integrated Modular Avionics (IMA), a complete and up-to-date data delivered from a source subsystem to another receiver subsystem in a timely fashion is required to maintain a deterministic network system behavior. "Synchronous" has been associated with a clock controlling events, but in the present disclosure a synchronous network is achieved based on generating and processing events based on critical scenarios identified for each of the three main IMA components. The synchronous network design solution reduces message latency and improves system performance. The concept of network synchronization relies on synchronizing each host computer MTF with the Ethernet switch via its associated End System and therefore the whole network of avionics computing systems is synchronized.

Aircraft use Avionic Full DupleX Switched Ethernet (AFDX). The avionics component relates to networks that are adapted to the avionics constrains. Full DupleX relates to the subscribers transmits and received the data at the same time. Switched relates to the data that are switched. Ethernet relates to conforming to the standard Ethernet 802.3. The AFDX is a deterministic network where each subscriber has free access to the network. For each virtual link (VL) in a receiver, the transfer time of the data is limited and computed by a formal approach using network calculus. The VL is a channel of communication between one transmitter and server receiver with a guaranteed bandwidth, limited latency and jitter, and a static path of VLs. The features are specified in ARINC A664 Part 7.

An avionics computer system connects to an asynchronous network through an end system (ES) and is capable of supporting multiple avionics subsystems using partitions that provide isolation between avionics subsystems. In an asynchronous network, the MTF which consists of multiple partitions of the avionics computers on the network, are never in sync. This means, the transmit partition which runs in its scheduled minor timeframe to publish on to the network is not aligned with the receiving partition of the avionics computer, therefore creating a message latency problem that require extensive work to find an appropriate network solution configuration that meets system requirements.

Figure 4:
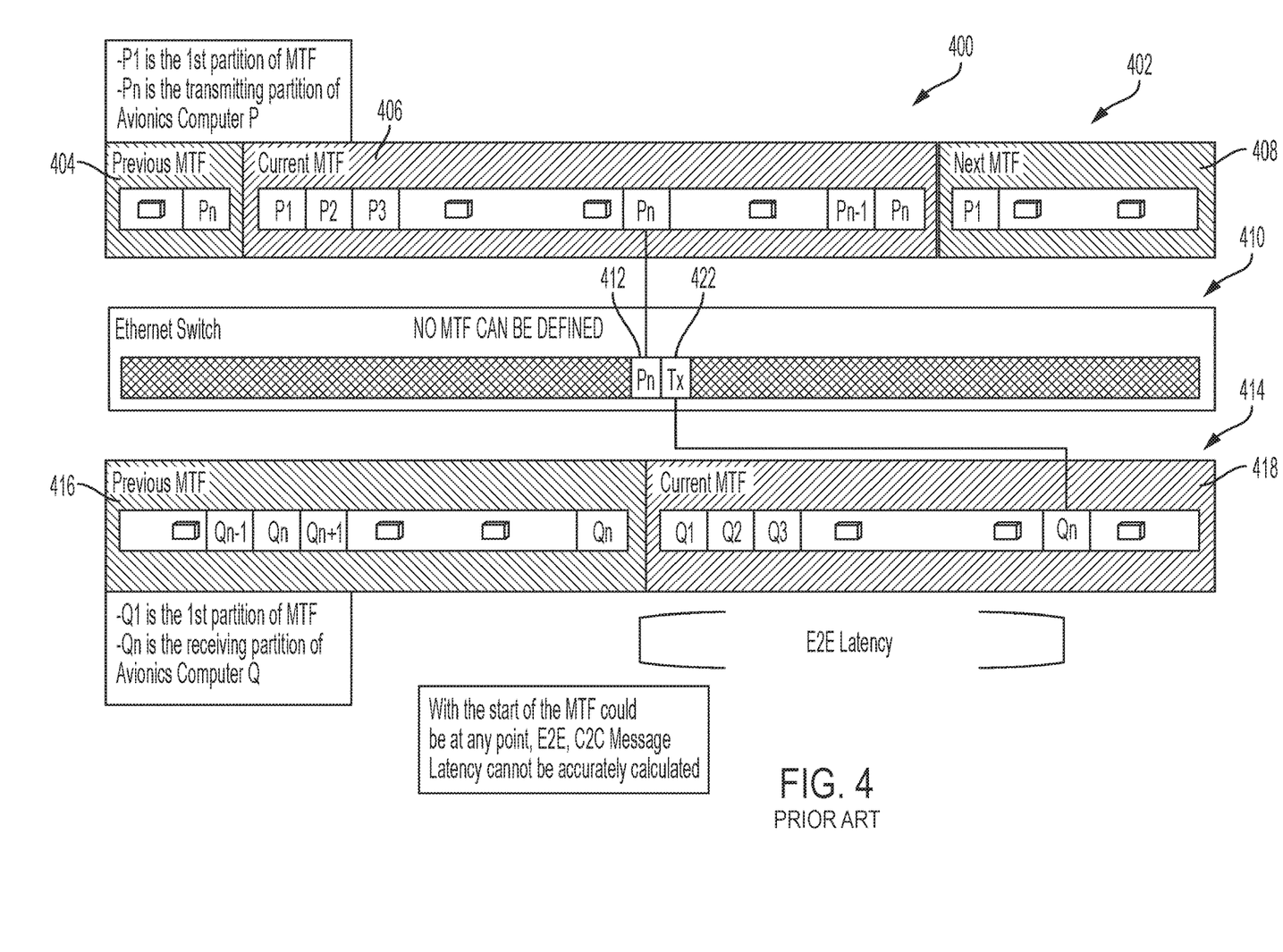
FIG. 4 shows end-to-end latency in an asynchronous network according to examples of the prior art.

The absence of a global clock or a global process to coordinate amongst the execution of the transmitting processes and the receiving processes render the objective of achieving a deterministic behavior of the network system a daunting and expensive task. FIG. 4 shows a prior art configuration of an asynchronous network that depicts end-to-end (E2E) latency. E2E latency in an asynchronous network calculation is never accurate because the MTF start on all of the computing nodes varies depending on when a subsystem was powered up or included in the network. FIG. 4 shows a scenario of calculating the End to End message latency: a first avionics time partition 402 for a first avionics computer P comprises a previous MTF 404, a current MTF 406, and a next MTF 408. For each MTF of the first avionics computer P, $P_1$ represents the first partition and $P_n$ represents the transmitting time partition. An Ethernet Switch time partition 410 of an Ethernet Switch comprises a receiving partition 412 that is aligned with $P_n$. A second avionics time partition 414 for a second avionics computer Q comprises a previous MTF 416 and a current MTF 418. For each MTF of the second avionics computer Q, $Q_1$ represents the first time partition and $Q_n$ represents the receiving time partition. A transmitting time partition 422 of the Ethernet Switch is associated with the receiving partition $Q_n$ of the second avionics computer Q. In this example shown in FIG. 4, with the start of the MTF being at any point end-to-end (E2E) messages latency cannot be accurately calculated.

Figure 5:
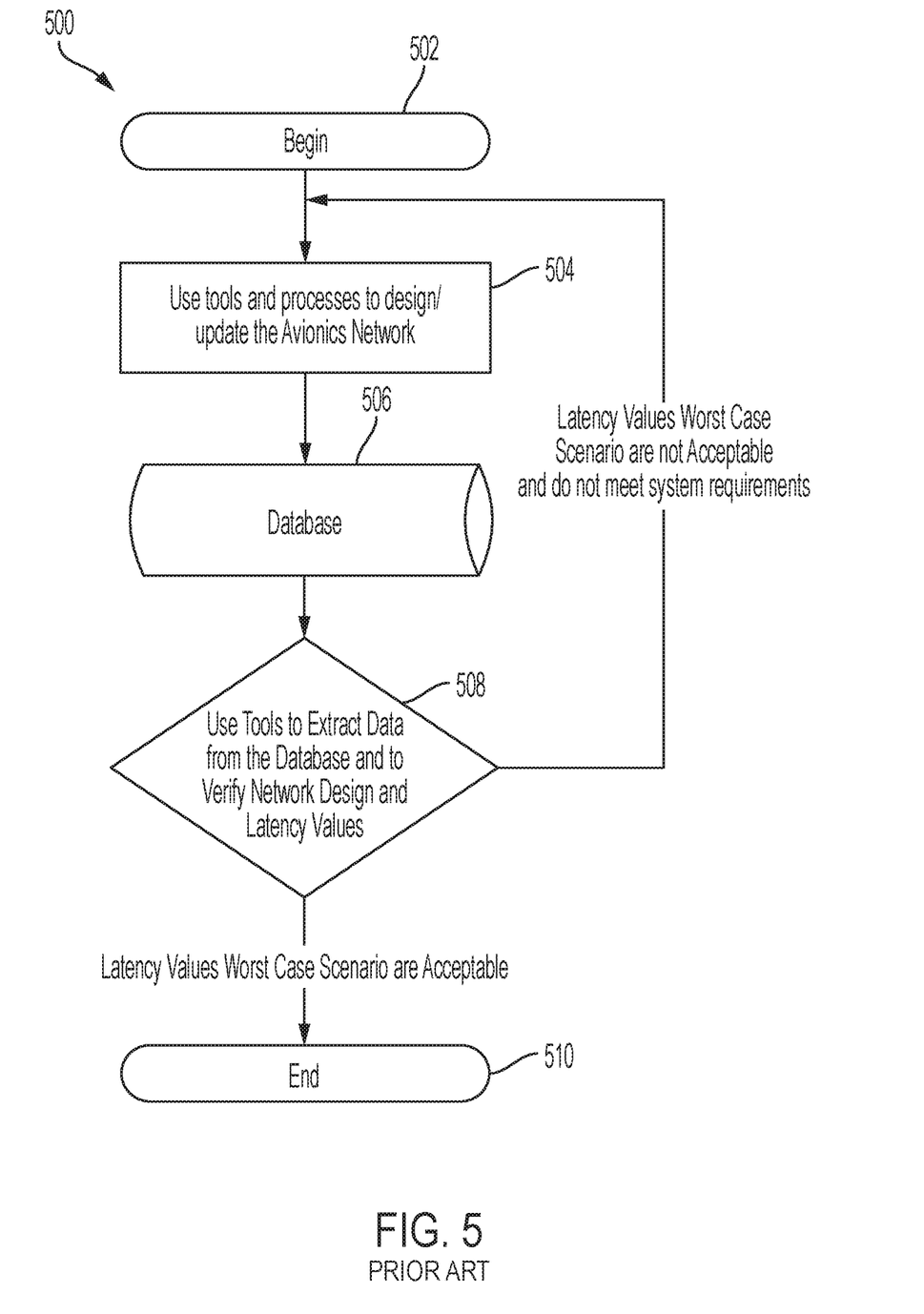
FIG. 5 shows an asynchronous network design method according to examples of the prior art.

FIG. 5 shows an asynchronous network design method 500 according to examples of the prior art. The method 500 begins at 502 and then proceeds to 504 where tools and processes are used to design/update an avionics network. The method 500 continues from 504 to 506 where a database is queried. The method 500 proceeds from 506 to 508 where a determination is made as to whether the tools are used to extract data from the database and to verify network design and latency values. If the results of the determination at 508 is negative, meaning that the network design and latency values are not verified, then the method 500 proceeds to 504 where the latency values worst case scenario are not acceptable and do not meet system requirements. If the results of the determination at 506 is positive, meaning that the latency values worst case scenario are acceptable, the method concludes at 510.

In a Time Synchronous Network, the MTF of all the host avionics computers have to be equal. Even the Ethernet switch has to keep a "cycle time frame" equal to the avionics computers MTF. The basic concept is when synching up all of the MTFs of all the avionics computers on the network with the Ethernet switch a global system clock is established. Therefore, transmitting and receiving messages can be easily configured to yield a predictable behavior with messages latency meeting systems requirements. To many users, introducing the clock to the avionics network systems represents a new risk they have to account for. Network design engineers have to add additional system design features to handle clock failures.

Generally speaking, the present disclosure provides for a synchronous network design based on Events, reduces latency, offers advantages in eliminating the global system clock, adds flexibility in the network configuration and enhance system performance. The following represents a summary of the characteristics of a synchronous network. Subsystems local clock is not used in the synchronization process. Therefore clock drift has no impact. Synchronous network guarantees that all avionics computers start their MTF (schedule that runs the applications partitions of the avionic subsystem) at the same time. A664 Ethernet Switch does not have to maintain a timing frame equivalent to the avionics computer MTF. Therefore, the global system clock concept is no longer a design requirement. Avionics computers can have different MTF sizes in a synchronized network. Network synchronization is established based on events generated and processed by the main components of the IMA network system.

The synchronous network comprises three components including avionics computers, end systems, and Ethernet switches. Timely events are generated by the end system at the request of the avionics computer and transmitted to the Ethernet switch to signal that end system is ready to integrate in the sync network and the avionics computer is ready to start executing its scheduled partitions of the MTF. The Ethernet switch collects all event synchronous frames (ESF) from all end systems and broadcasts sync network status. The network synchronization design includes software design implementation taking place in the avionics computer as well as hardware design implementation taking place in the end system and the Ethernet switch field programmable gate arrays (FPGAs).

Figure 6:
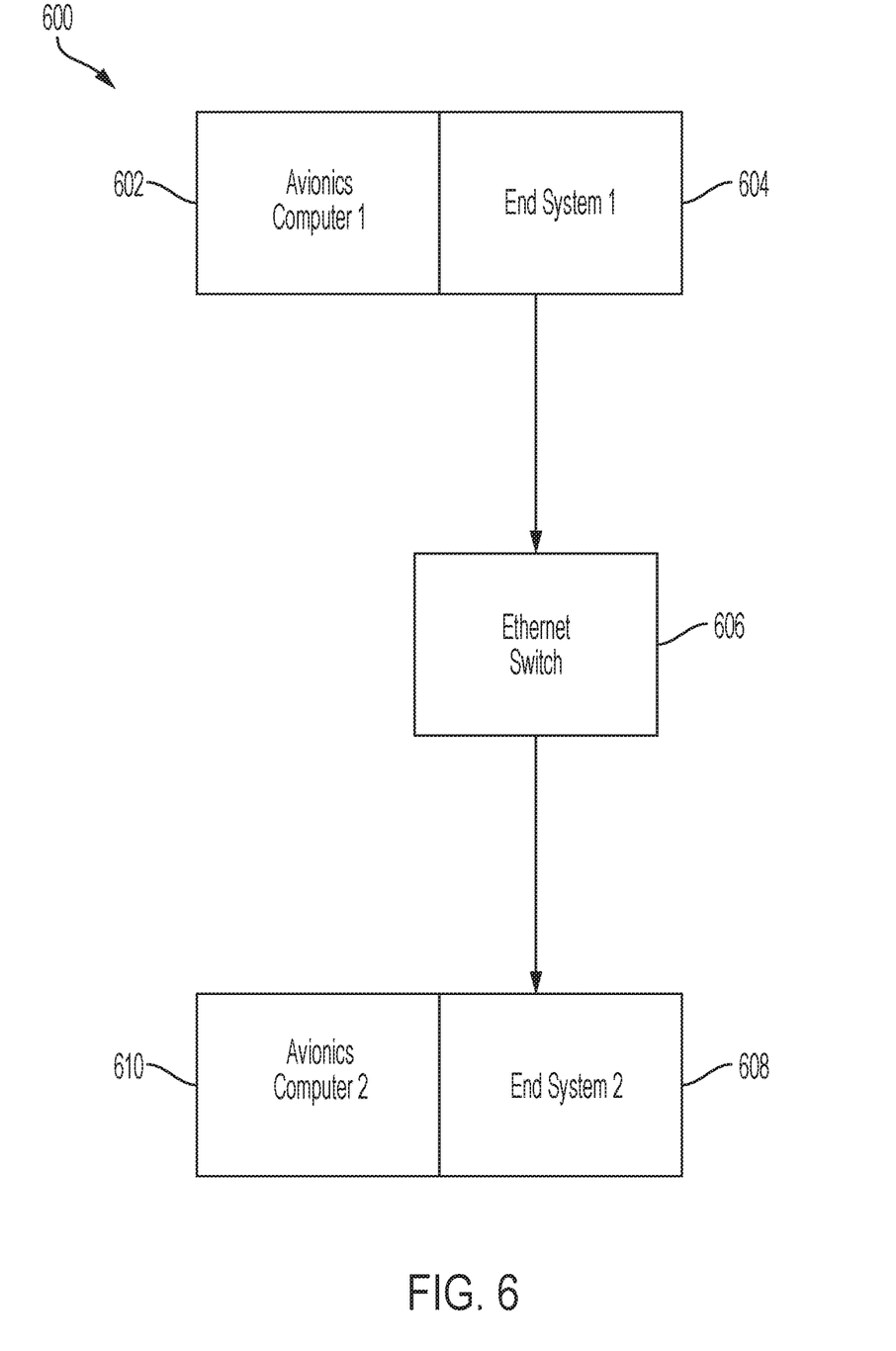
FIG. 6 shows a network architecture according to examples of the present disclosure.

FIG. 6 shows a network architecture 600 in accordance with examples of the present disclosure. The network architecture 600 comprises a first avionics computer 602 in data communication with a first end system 604. The first end system 604 is in data communication with an Ethernet switch 606. The Ethernet switch 606 is in data communication with a second end system 608. The second end system 608 is in data communication with a second avionics computer 610. In the synchronous computer-controlled communications network, the synchronous network is synchronized by a synchronization schedule that provides a common start time of a Major Time Frame or the start of a particular partition of the one or more avionics computers, such as the first avionics computer 602, based on a user configuration. For example, the first avionics computer 602 of the one or more avionics computers is configured to transmit an Event Synchronous Frame (ESF) to the Ethernet switch 606. In some examples, the ESF is formatted as an Ethernet frame. The ESF indicates that the first avionics computer 602 is ready to integrate in a configured synchronous computer-controlled communications network. The first avionics computer 602 is configured to receive a network notification, a health and status notification, or both from the Ethernet switch 606 indicating how to proceed to integrate into the configured synchronous computer-controlled communications network. The Ethernet switch 606 is configured to receive the ESF from the first avionics computer 602 through a first end system of the one or more end system, such as the first end system 604, process the ESF based on a network configuration, and transmit the network notification, the health and status notification, or both to each avionic computer of the one or more avionics computers, such as the first avionics computer 602 and the second avionics computer 610, on the synchronous computer-controlled communications network.

In some examples, the common start time is established by aligning the major time frame or a configured process for each avionic computer, such as the first avionics computer 602 and the second avionics computer 610, on the configured synchronous computer-controlled communications network through a respective end system, such as the first end system 604 and the second end system 608, respectively. In some example, a size of the major time frame is not uniform for all the one or more avionics computers on the configured synchronous computer-controlled communications network. In some examples, additional network synchronization schedules and network attributes are configured based on an additional ESF.

Figure 7:
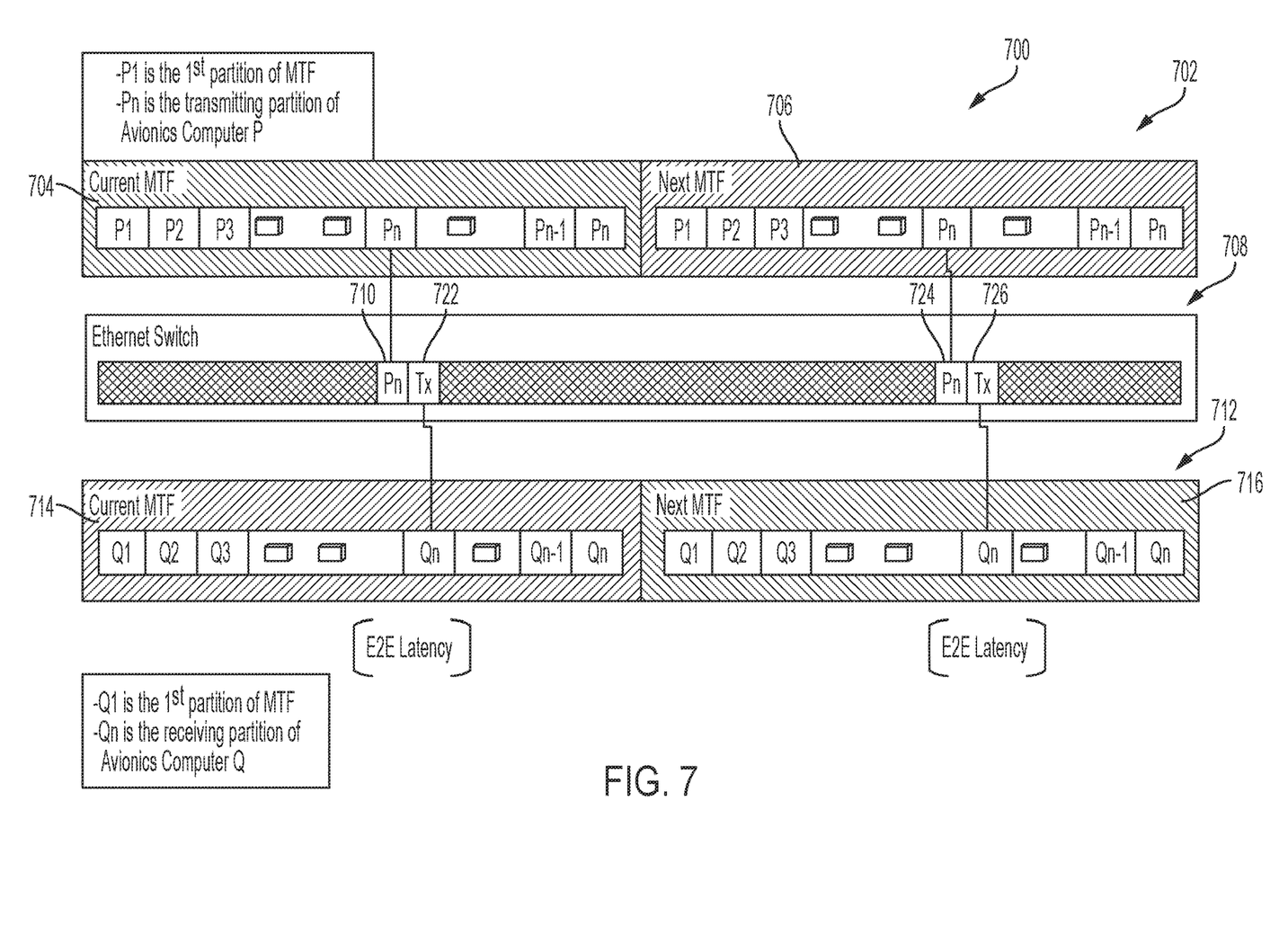
FIG. 7 shows time depiction according to examples of the present disclosure.

FIG. 7 shows time depiction 700 for a synchronous network E2E latency, according to examples of the present disclosure. A start of a MTF of a first avionics computer is shown at 702. An Ethernet switch adjusts to computers start of MTF is shown at 704. A start of MTF of a second avionics computer is shown at 706. E2E Latency in a Synchronous Network=E2E Latency. In a synchronous network, the start of the MTF of all of the host computers providing data to the corresponding end systems is aligned (including the start of the MTF of the A664 Ethernet switch), therefore the E2E latency is smaller and only dependent on the processing time plus the wire length transfer delay.

As shown in FIG. 7, a first avionics time partition 702 for a first avionics computer P comprises a current MTF 704 and a next MTF 706. For each MTF of the first avionics computer P, $P_1$ represents the first partition and $P_n$ represents the transmitting time partition. An Ethernet Switch time partition 708 of an Ethernet Switch comprises a first receiving partition 710 that is aligned with $P_n$. A second avionics time partition 712 for a second avionics computer Q comprises a current MTF 714 and a next MTF 716. For each MTF of the second avionics computer Q, $Q_1$ represents the first time partition 718 and $Q_n$ represents the receiving time partition 720. A first transmitting time partition 722 of the Ethernet Switch is associated with the receiving partition $Q_n$ of the second avionics computer Q. A second transmitting partition of the next MTF 706 of the first avionics computer P is aligned with a second receiving partition 724 of the Ethernet Switch time partition 708. A second transmitting partition 726 of the Ethernet Switch is aligned with a second receiving partition of the next MTF 716 of the second avionic computer Q. The E2E latency for the current MTF 704 is the time duration for the receiving partition and the transmitting partition. Similarly, the E2E latency of the next MTF is the time duration for the receiving partition and the transmitting partition.

For example, the protocol frames that can be used to establish network synchronization are referred to as Event synchronous frames (ESF). These frames are generated and processed by the end system, Ethernet switch, and the avionics computer. The host computer initiates the process of integrating the avionics computing system into the sync network by creating a ESF. The ESF payload contains a set of defined fields that are populated based on the network synchronization defined by the user. The set of defined fields include a sync network ID (multiple networks can be defined on the same switch), sync type (MTF, processes, lockstep), sync role (master, slave, lockstep), subsystems IDs on the network, sync priority, and hardware health and status.

The end system with a FPGA receives and processes ESF frames from the host computer and transmits them to the Ethernet switch. The end system also receives and processes ESF frames from the Ethernet switch and transmits them to the host computer. The end system does not alter the ESF payloads, but schedules and prioritizes frames based on a network configuration to transmit on the network. The Ethernet switch with a FPGA receives the ESF from all end systems and builds a single ESF frame to include status for all end system on the sync network per a network configuration. The Ethernet switch also transmits the new ESF built frame to all end systems on the network.

Figure 8:
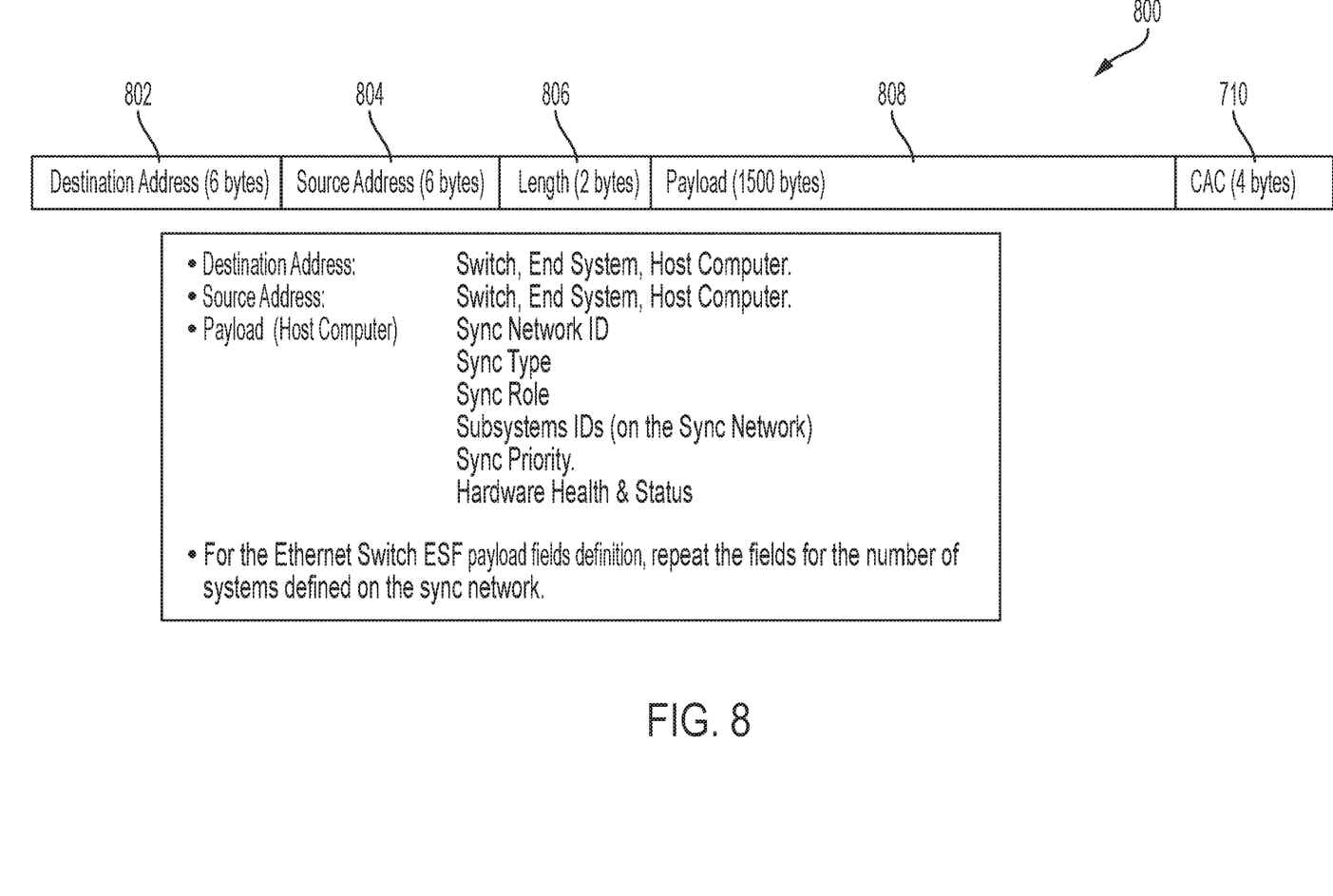
FIG. 8 shows an event synchronous frame format according to examples of the present disclosure.

FIG. 8 shows an ESF format 800 according to examples of the present disclosure. The ESF format 800 comprises a destination address field 802, a source address field 804, a length field 806, a payload field 808, and a cyclic redundancy check (CRC) field 810. In some examples, the destination address field 802 has a length of 6 bytes, the source address field 804 has a length of 6 bytes, the length field 806 has a length of 2 bytes, the payload field 808 has a length of 1500 bytes, and the CRC field 810 has a length of 4 bytes. In some examples, a destination address in the destination address field 802 can be a switch, an end system, or a host computer. In some examples, a destination address in the destination address field 802 can be a switch, an end system, or a host computer. In some examples, a source address in the source address field 804 can be a switch, an end system, or a host computer. In some examples, a payload in the payload field 808 can include sync network ID, a sync type, a sync role, subsystem(s) ID(s) on the sync network, sync priority, and hardware health and status information. For the Ethernet switch ESF payload fields definition, the fields repeat for the number of systems defined on the sync network. Reserved Virtual Link (VL) IDs are allocated to ESF frames.

In operation, each component/subsystem on the synchronous network can impact synchronization. There are events that happen to every component/subsystem, and the objective is to identify the event that impact synchronization to take corresponding actions. The events that impact synchronization for an avionics computer include a start/end of the avionics subsystems partitions. The events that impact synchronization of an end system include receiving a signal from the avionics computer that is ready to integrate in the sync network and receiving network status from the Ethernet Switch. The events that impact synchronization of an Ethernet Switch include status frames, e.g., ESF Frames, received from end systems. The avionics computer develops a process to switch to a synchronization schedule to send/receive/process point coordination function ESF frames. Every component/subsystem on the network follows the designed process on how to handle the events identified. The end system develops a process to transmit the ESF frames to send to the Ethernet switch when requested by the avionics computer. Also, the end system develops a process to receive ESF frames from the Ethernet Switch to send back to the avionics computer. The Ethernet switch develops a process to receive the ESF frames from each end system on the network, from which, builds a response frame and sends it to all end systems on the sync network.

The processes for handling network synchronization are executed in a timely manner not to exceed the time range set by the user. Therefore, the network synchronization schedule includes a single partition with a duration set by the user and establishes the timing allowed to integrate a system in the sync network.

Figure 9:
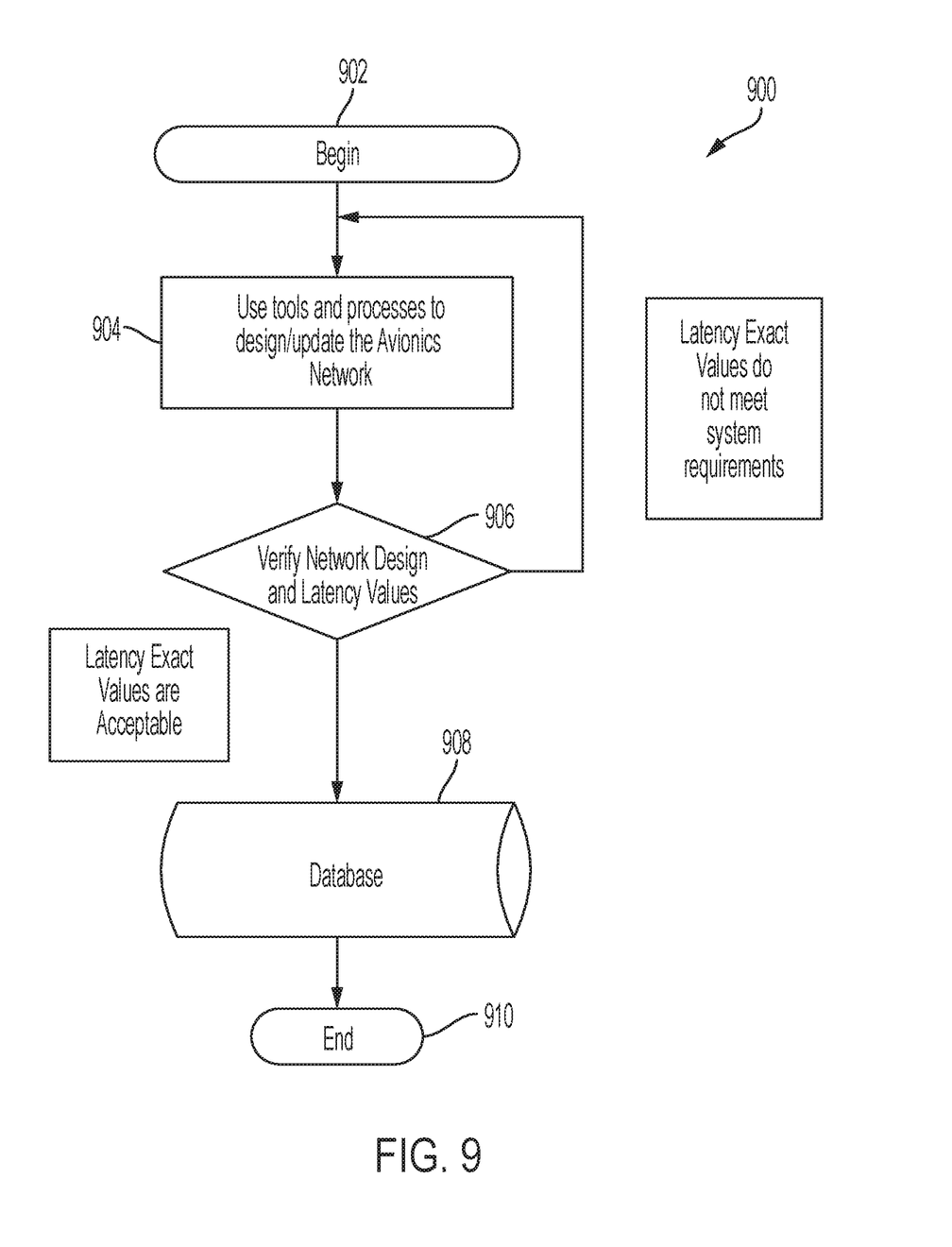
FIG. 9 shows a synchronous network design method according to examples of the present disclosure.

FIG. 9 shows a synchronous network design method 900 according to examples of the present disclosure. The method 900 begins at 902 and then proceeds to 904 where tools and processes to design/update an avionics network. The method 900 continues from 904 to 906 where a determination is made as to whether the network design and latency values are verified. If the results of the determination at 906 is positive, meaning that the latency exact values are acceptable, then the method 900 proceeds to 908 where a database is queried. If the results of the determination at 906 is negative, meaning that the latency exact values do not meet the system requirements, then the method 900 proceeds to 904. The method 900 concludes at 910.

Figure 10:
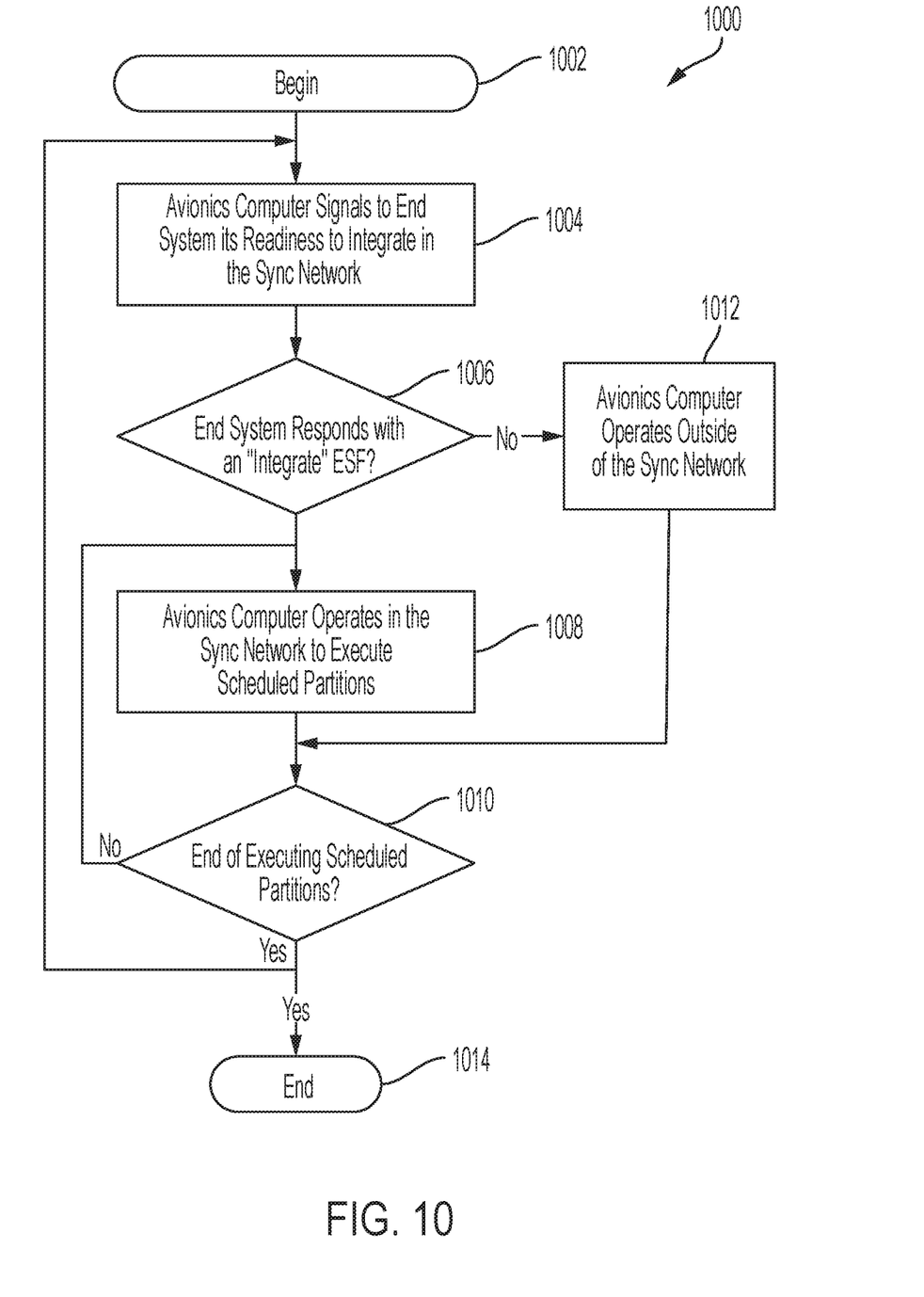
FIG. 10 shows avionics computer sync method according to examples of the present disclosure.

FIG. 10 shows avionics computer sync method 1000 according to examples of the present disclosure. The method 1000 begins at 1002 and then proceeds to 1004 where the avionics computer signals to an end system it readiness to integrate in the synch network. The method proceeds from 1004 to 1006 where a determination is made where the end system responds with an integrate ESF. If the results of the determination of 1006 is yes then the method 1000 proceeds to 1008 where the avionics compute operates in the sync network to execute scheduled partitions. The method 1000 then proceeds from 1008 to 1010 where a determination is made whether the end of executing scheduled partitions. If the results of the determination at 1010 is negative, the method 1000 proceeds from 1010 to 1008. If the results of the determination of 1010 is positive, then the method 1000 proceeds to 1004. If the results of the determination of 1006 is negative, then the method 1000 proceeds to 1012 where the avionics computer operates outside of the sync network. The method 1000 then proceeds from 1012 to 1010. The method 1000 concludes at 1014.

Figure 11:
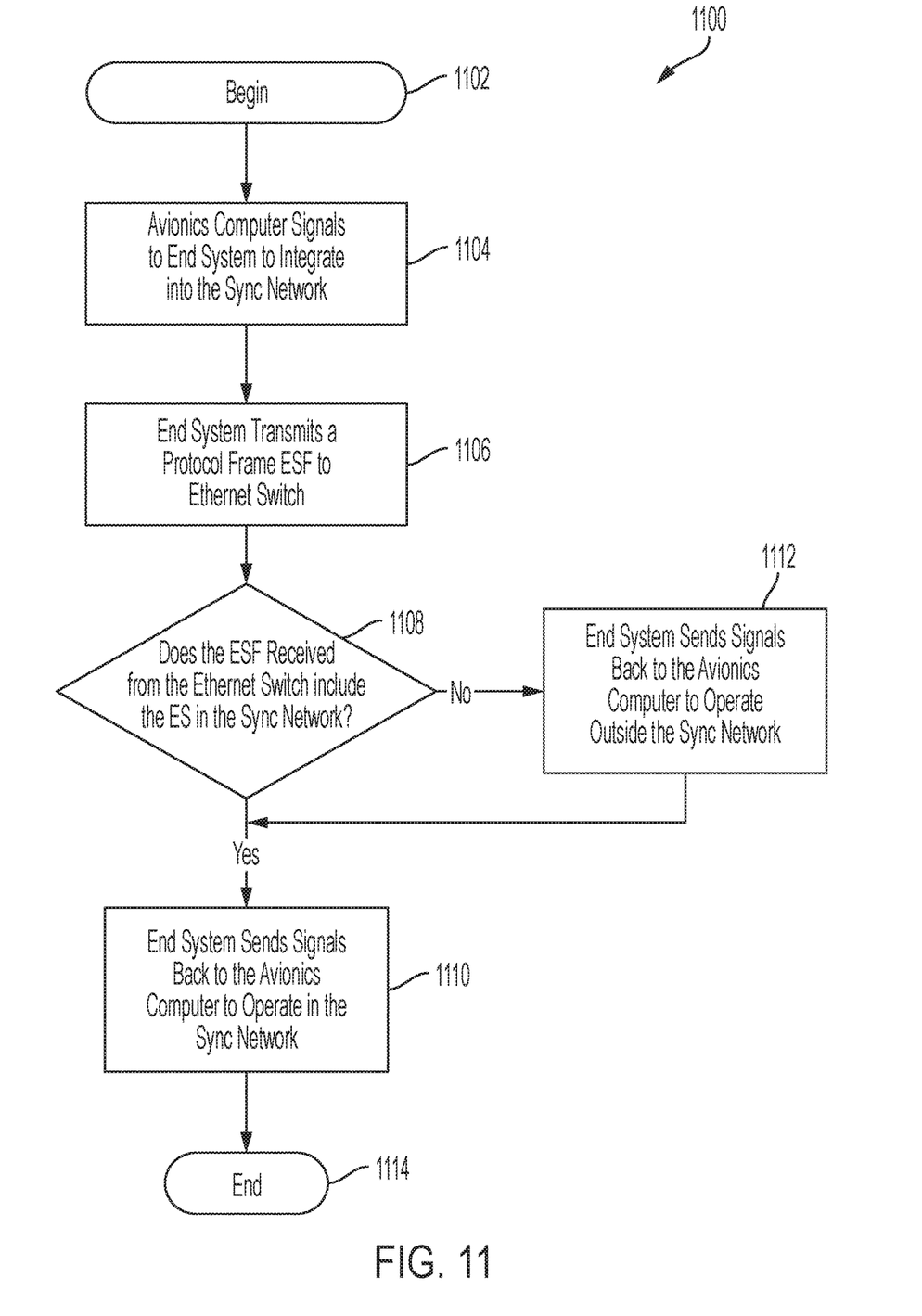
FIG. 11 shows a method according to examples of the present disclosure

FIG. 11 shows a method 1100 according to examples of the present disclosure. The method 1100 begins at 1102 and then proceeds to 1104 where an avionics computer signals to an end system to integrate into a sync network. The method 1100 then proceeds from 1104 to 1106 where the end system transmits an ESF to the Ethernet switch. The method 1100 then proceeds from 1106 to 1108 where a determination is made as to whether the ESF received from the Ethernet switch includes the end system in the sync network. If the results of the determination at 1108 is positive, then the method 1100 proceeds to 1110 where the end system sends signals back to the avionics computer to operate in the sync network. If the results of the determination at 1108 is negative, then the method 1100 proceeds to 1112 where the end system sends signals back to the avionics computer to operate outside of the sync network. The method 1100 then proceeds from 1112 to 1110. The method 1100 concludes at 1114.

Figure 12:
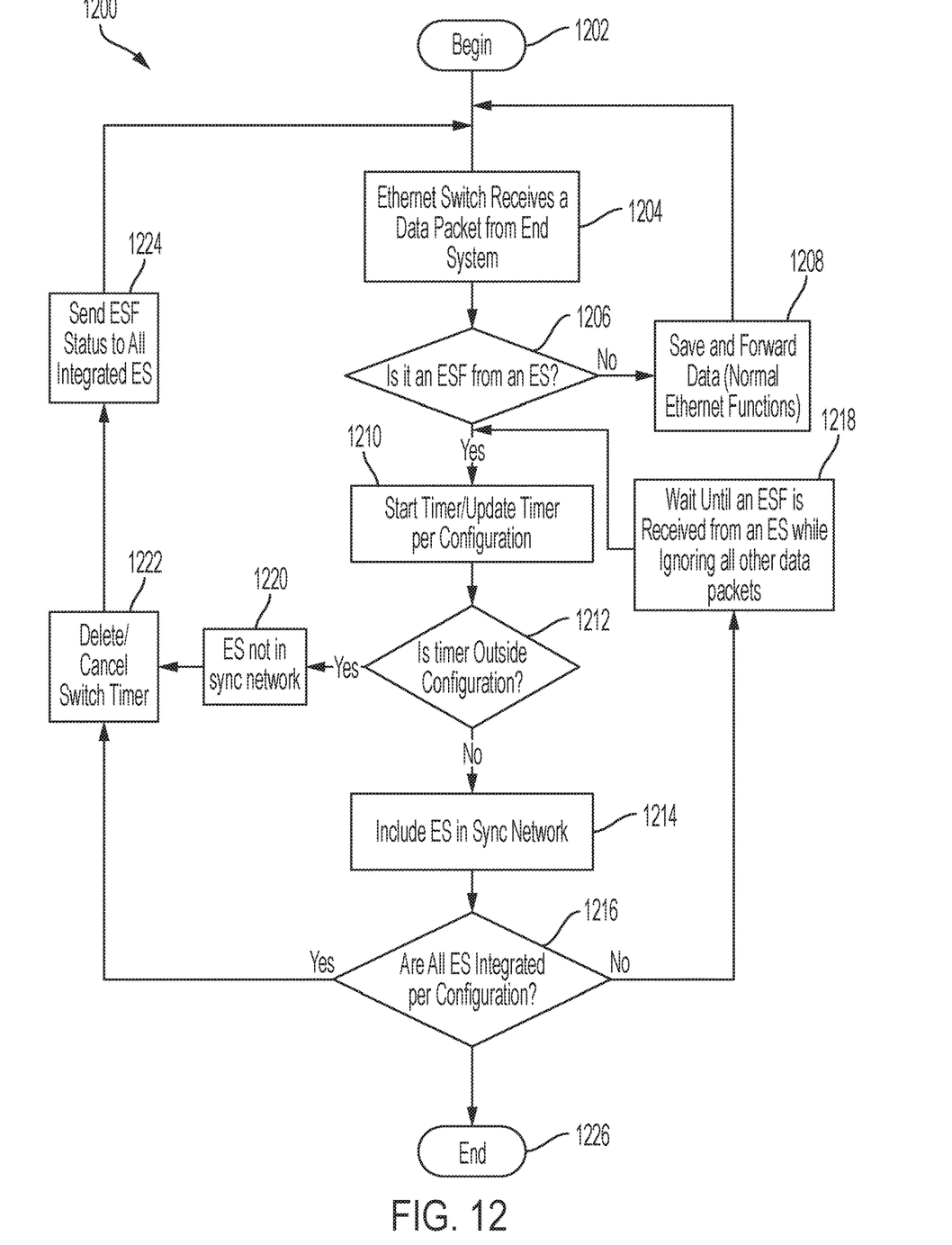
FIG. 12 shows an Ethernet switch sync method according to examples of the present disclosure.

FIG. 12 shows an Ethernet switch sync method 1200 according to examples of the present disclosure. The method 1200 begins at 1202 and then proceeds to 1204 where the Ethernet switch receives a data packet from an end system. The method 1200 continues to 1206 where a determination is made as to whether it is a ESF from an ES. If the result of the determination at 1206 is negative, then the method 1200 proceeds to 1208 where normal Ethernet functions are performed and the data is saved and forwarded. If the results of the determination at 1206 is positive, then the method 1200 proceeds to 1210 where a timer is started and/or updated based on configuration data. The method 1200 proceeds from 1210 to 1212 where a determination is made as to whether the timer is outside of configuration. If the result of the determination at 1212 is negative, then the method 1200 proceeds to 1214 where ES is included in the synch network. The method 1200 proceeds from 1214 to 1216 where a determination is made as to whether all ES are integrated in the synch network based on the configuration. If the result of the determination of 1216 is negative, then the method 1200 proceeds to 1218 where the method 1200 waits until a ESF is received from an ES while ignoring all other data packets. The method 1200 then proceeds from 1218 to 1210.

If the result of the determination at 1212 is positive, then the method 1200 proceeds to 1220 where the ES is not in the synch network. The method 1200 then proceeds from 1220 to 1222 where a delete/cancel switch timer. The method 1200 then proceeds from 1222 to 1224 where ESF sends status to all integrated ES. The method 1200 then proceeds from 1224 to 1204. If the result of the determination at 1216 is positive, then the method 1200 proceeds to 1222 where the delete/cancel switch timer. In the method 1200, steps 1210, 1212, 1220, and 1222 are intended for equal MTFs. For different size MTFs, these steps may be omitted. The method 1200 can then end at 1226.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A synchronous computer-controlled communications network comprising:
an Ethernet network switch;
one or more avionics computers communicatively coupled in the synchronous computer-controlled communications network, and
one or more end systems communicatively coupled in the synchronous computer-controlled communications network, wherein each of the one or more end systems is communicatively coupled with at least one of the one or more avionics computers,
wherein the synchronous computer-controlled communications network is synchronized by a synchronization schedule that provides a common start time of a Major Time Frame or a start of a particular partition of the one or more avionics computers based on a user configuration,
wherein a first avionics computer of the one or more avionics computers is configured to transmit an Event Synchronous Frame (ESF) to the Ethernet network switch, wherein the ESF indicates that the first avionics computer is ready to integrate in a configured synchronous computer-controlled communications network, and wherein the first avionics computer is configured to receive a network notification, a health and status notification, or both from the Ethernet network switch indicating how to proceed to integrate into the configured synchronous computer-controlled communications network, and
wherein the Ethernet network switch is configured to receive the ESF from the first avionics computer through a first end system of the one or more end system, process the ESF based on a network configuration, and transmit the network notification, the health and status notification, or both to each avionic computer of the one or more avionics computers on the synchronous computer-controlled communications network.

2. The synchronous computer-controlled communications network of claim 1, wherein the ESF is formatted as an Ethernet frame.

3. The synchronous computer-controlled communications network of claim 1, wherein the common start time is established by aligning the major time frame or a configured process for each avionic computer on the configured synchronous computer-controlled communications network through a respective end system.

4. The synchronous computer-controlled communications network of claim 3, wherein a size of the major time frame is not uniform for all the one or more avionics computers on the configured synchronous computer-controlled communications network.

5. The synchronous computer-controlled communications network of claim 1, wherein the synchronous computer-controlled communications network is an avionics full-duplex switched Ethernet (AFDX) data network.

6. The synchronous computer-controlled communications network of claim 1, wherein additional network synchronization schedules and network attributes are configured based on an additional ESF.

7. The synchronous computer-controlled communications network of claim 1, wherein the ESF comprises of a set of defined reserved Virtual Link ID to indicate to the Ethernet switch that a message transmitted by the first avionics computer is a protocol frame and to be processed by the Ethernet network switch.

8. A computer-implemented method of providing a common start time for an application partition schedule for communicating parties in a synchronous computer-controlled communications network, the method comprising:
providing, by an avionics computer, a readiness signal to an end system associated with the avionics computer, wherein the readiness signal indicates the avionics computer readiness to integrate into a synchronous network;
providing, by the avionics computer, an Event Synchronous Frame (ESF) to an Ethernet switch through the end system;
receiving, by the avionics computer, a response from the end system based on the readiness signal;

receiving, by the avionic computer, a network health and status for other avionic computers on the synchronous computer-controlled communications network; and executing, by the avionics computer in the synchronous computer-controlled communications network, a synchronization schedule, wherein the synchronization schedule provides for establishment of avionics subsystem partitions execution is included in the synchronous computer-controlled communications network.

9. The computer-implemented method of claim 8, wherein the readiness signal is provided as the ESF.

10. The computer-implemented method of claim 9, wherein the ESF is formatted as an Ethernet frame.

11. The computer-implemented method of claim 9, wherein the ESF comprises a defined reserved Virtual Link ID to indicate that the avionics computer is ready to integrate into the synchronous computer-controlled communications network.

12. A computer-implemented method of providing a common start time for an application partition schedule for communicating parties in a synchronous computer-controlled communications network, the method comprising:

executing, by an avionics computer on the synchronous computer-controlled communications network, a synchronization schedule, wherein the synchronization schedule provides a common start time for an application partition schedule;

providing, by the avionics computer on the sync network, an Event Synchronous Frame (ESF) to an associated end system;

providing, by the associated end system, the ESF to a network switch when a corresponding avionics computer is ready to integrate in the synchronous network;

receiving, by the associated end system, a network status from the network switch to be provided to the avionics computer;

receiving, by the network switch, EFS from the associated end system on the synchronous network;

processing, by the network switch, the EFS based on a network configuration; and transmitting, by the network switch, the network status to each avionics computer on the synchronous network through associated end systems.

13. The computer-implemented method of claim 12, wherein the network switch is an Ethernet switch.

14. The computer-implemented method of claim 12, wherein the ESF is formatted as an Ethernet frame.

15. The computer-implemented method of claim 12, wherein the ESF provides for a common start time by aligning a major time frame or a configured process for each avionic computer on the synchronous network through an associated end system.

16. The computer-implemented method of claim 15, wherein a size of the major time frame is not uniform for other avionics computers on the synchronous network.

17. The computer-implemented method of claim 12, wherein the synchronous network is an avionics full-duplex switched Ethernet (AFDX) data network.

18. The computer-implemented method of claim 12, wherein the ESF comprises a defined reserved Virtual Link ID to indicate that the avionics computer is ready to integrate into the synchronous network.

19. The computer-implemented method of claim 12, wherein the ESF provides for a common start time by aligning a major time frame or a configured process for each avionic computer on the synchronous network through an associated end system.

20. The computer-implemented method of claim 19, wherein a size of the major time frame is not uniform for other avionics computers on the synchronous network.

\* \* \* \* \*